US006915860B2

(12) United States Patent
Feller

(10) Patent No.: US 6,915,860 B2
(45) Date of Patent: Jul. 12, 2005

(54) HIGH GROUND-CLEARANCE ROUGH TERRAIN FIRE FIGHTING VEHICLE

(75) Inventor: Daniel A. Feller, P.O. Box 541, Hunt, TX (US) 78024

(73) Assignee: Daniel A. Feller, Hunt, TX (US)

( * ) Notice: Subject to any disclaimer, the term of this patent is extended or adjusted under 35 U.S.C. 154(b) by 0 days.

(21) Appl. No.: 10/328,626

(22) Filed: Dec. 23, 2002

(65) Prior Publication Data

US 2004/0118937 A1 Jun. 24, 2004

(51) Int. Cl.[7] .......................... A62C 2/00; A62C 3/00; A01G 27/00; A01G 25/09; B05B 9/03

(52) U.S. Cl. ......................... 169/43; 239/146; 239/172; 280/838

(58) Field of Search .............................. 169/43, 24, 52, 169/70; 239/146, 172, 195, 302; 280/838

(56) References Cited

U.S. PATENT DOCUMENTS

| | | | | | |
|---|---|---|---|---|---|
| 1,329,039 | A | * | 1/1920 | Davis et al. | 280/838 |
| 2,246,616 | A | * | 6/1941 | Cherry | 293/127 |
| 2,533,772 | A | * | 12/1950 | DeFrees | 280/4 |
| 3,393,835 | A | * | 7/1968 | Kantor et al. | 222/105 |
| 3,770,060 | A | * | 11/1973 | Forsyth et al. | 169/24 |
| 4,018,354 | A | * | 4/1977 | Lawler | 220/562 |
| 4,593,855 | A | | 6/1986 | Forsyth | 239/74 |
| 4,678,041 | A | * | 7/1987 | Staudinger | 169/24 |
| 5,368,317 | A | | 11/1994 | McCombs et al. | 280/4 |
| 5,467,827 | A | | 11/1995 | McLoughlin | 169/24 |
| 5,617,696 | A | | 4/1997 | Young | 52/730.1 |
| 5,788,437 | A | * | 8/1998 | Kalis, Jr. | 410/107 |
| 5,960,981 | A | | 10/1999 | Dodson et al. | 220/563 |
| 6,029,750 | A | * | 2/2000 | Carrier | 169/52 |
| 6,139,081 | A | | 10/2000 | Lemieux | 296/37.7 |
| 6,161,272 | A | | 12/2000 | Madison | 29/469 |
| 6,367,648 | B1 | | 4/2002 | Boone, Jr. et al. | 220/563 |
| 6,571,882 | B2 | * | 6/2003 | Yen | 169/24 |

OTHER PUBLICATIONS

United States Department of Transportation/Federal Aviation Administration—Advisory Circular No.: 150/5220-10B; Bennett, David; published Oct. 20, 1997; pp. 1, 17, and 18.*

* cited by examiner

*Primary Examiner*—David A. Scherbel
*Assistant Examiner*—Darren Gorman
(74) *Attorney, Agent, or Firm*—Fulbright & Jaworski, LLP

(57) ABSTRACT

A fire fighting apparatus includes a high ground-clearance motorized vehicle having a chassis and rear drive wheels, and a quenching agent tank affixed to the chassis, the quenching agent tank being made of a first tank portion; and a second tank portion located between the first tank portion and the chassis, a width of the second tank portion being greater than a width of the first tank portion, and a distance between a center of mass of the tank and the chassis being as small as possible.

8 Claims, 6 Drawing Sheets

HIGH GROUND-CLEARANCE ROUGH TERRAIN FIRE FIGHTING VEHICLE

BACKGROUND OF THE INVENTION

1. Field of the Invention

The invention relates to fire fighting vehicles.

2. Background of the Invention

Fire fighting vehicles for use in fighting forest fires, grass fires and other situations involving rough terrain are known. Typically such vehicles are multiple-wheel drive trucks with high-ground clearance in order to permit traversing steep and uneven terrain. However, this high ground clearance necessarily results in a high center of mass and a resultant degradation in vehicle stability. One such known fire truck used, for example, by the U.S. Forest Service, is based upon a military surplus truck which includes a flat bed load carrying surface mounted on the vehicle chassis, and located behind the passenger cab. Such vehicles typically have been retrofit for use as rough-terrain fire fighting vehicles by affixing a rectangular or cylindrical water tank and water pumping equipment directly to the existing flat bed.

However, such retrofitted configurations have proven unstable in rough and hilly terrain. In particular such vehicles are prone to roll over when moving transverse to a steep slope. The high center of mass of such vehicles also degrades road handling characteristics, particularly when cornering, thus decreasing the maximum speed of the vehicle and potentially increasing fire response times. Further, the high center of mass has limited the practical height of the water tanks in an attempt to improve stability, which results in the undesirable reduction in tank capacity. Still further, visibility rearward from the passenger compartment was often restricted by such tanks, thus rendering the trucks difficult to back and often dangerous when backing.

It would thus be desirable to provide a rough terrain fire fighting vehicle with improved rollover and road handling stability, while at the same time maintaining or increasing water carrying capacity and while maintaining rearward visibility, a high ground clearance and the ability to negotiate rough terrain.

SUMMARY OF THE INVENTION

The above-shortcomings of the prior art are reduced or eliminated by the fire truck of the present invention.

In an illustrated embodiment, a fire fighting apparatus is provided that includes a high ground-clearance motorized vehicle having a chassis and at least rear drive wheels, and a quenching agent tank affixed to the chassis, the quenching agent tank being made of a first tank portion; and a second tank portion located between the first tank portion and the chassis, a width of the second tank portion being greater than a width of the first tank portion, and a distance between a center of mass of the tank and the chassis being as small as possible.

Other features and associated advantages will become apparent with reference with reference to the following detailed description of specific embodiments in connection with the accompanying drawings.

BRIEF DESCRIPTION OF THE DRAWINGS

The drawings accompanying and forming part of this specification are included to depict certain aspects of the invention. A clearer conception of the invention, and of the components provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

DETAILED DESCRIPTION

The fire truck of the present invention addresses the shortcomings of conventional apparatus such as those discussed above. Ground clearance, water carrying capability and vehicle stability are all maximized.

Figure 1:
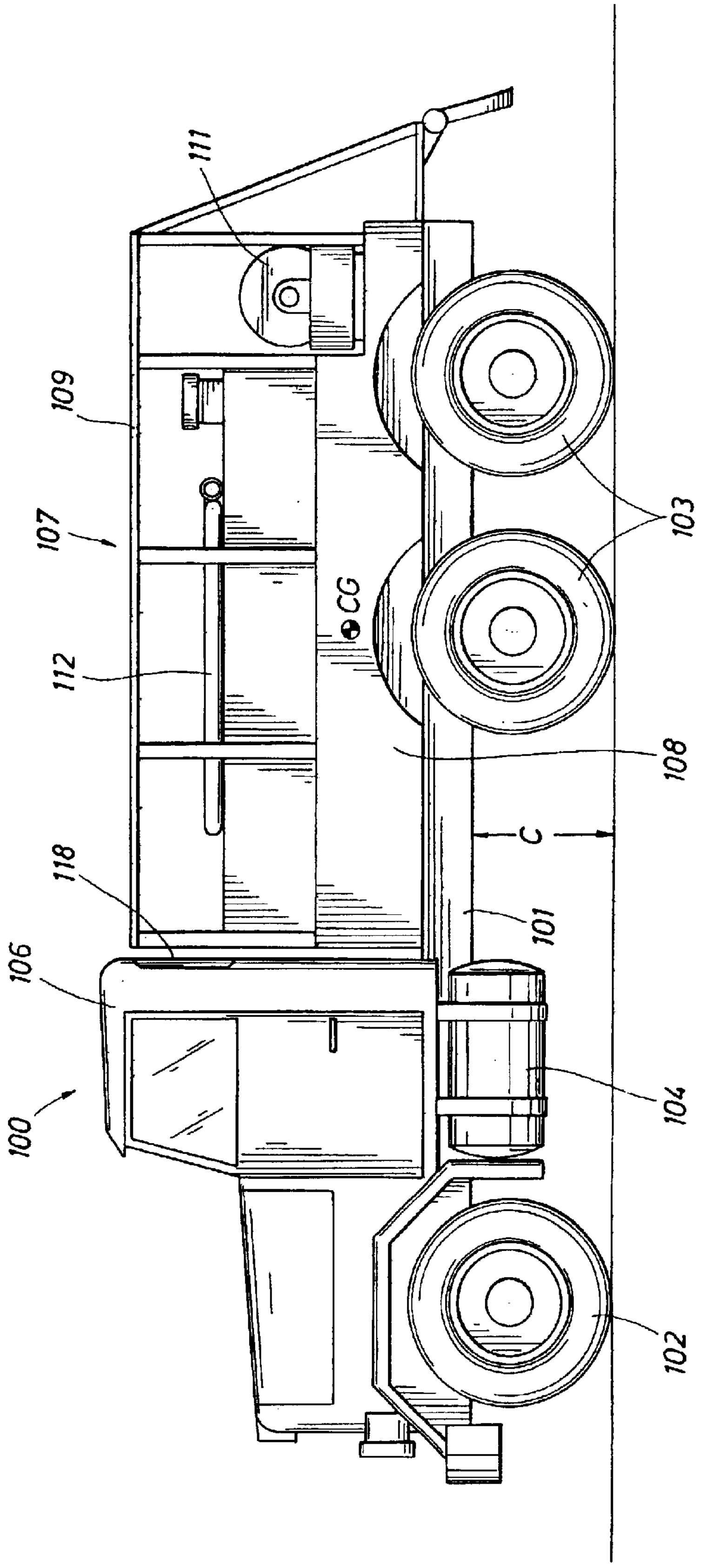
FIG. 1 is a side plan view of a vehicle accordance with an embodiment of the present invention.

A representative embodiment of a fire truck 100 in accordance with the present invention is shown in FIG. 1. Truck 100 is based upon a M35 A2 2.5 Ton military surplus vehicle configured in the cargo configuration, and includes many original components. Fire truck 100 includes chassis 101 upon which are mounted a truck engine and drivetrain (not shown), front wheels 102 and rear wheel sets 103, vehicle fuel tank 104 and passenger compartment 106. In addition, fire truck 100 includes water tank assembly 107, including water tank 108, safety railing 109, hose reel 111, and fire hose and filler hose storage 112. The truck is always driven by all sets of rear wheels 103, and may also be driven by front wheels 102, either permanently or selectively, depending on vehicle configuration. Rear wheel sets 103 are preferably dual tire sets. Thus, fire truck 100 is preferably a multiple-wheel drive vehicle, and in one embodiment may be a three-axle, ten-wheel drive vehicle.

Figure 2:
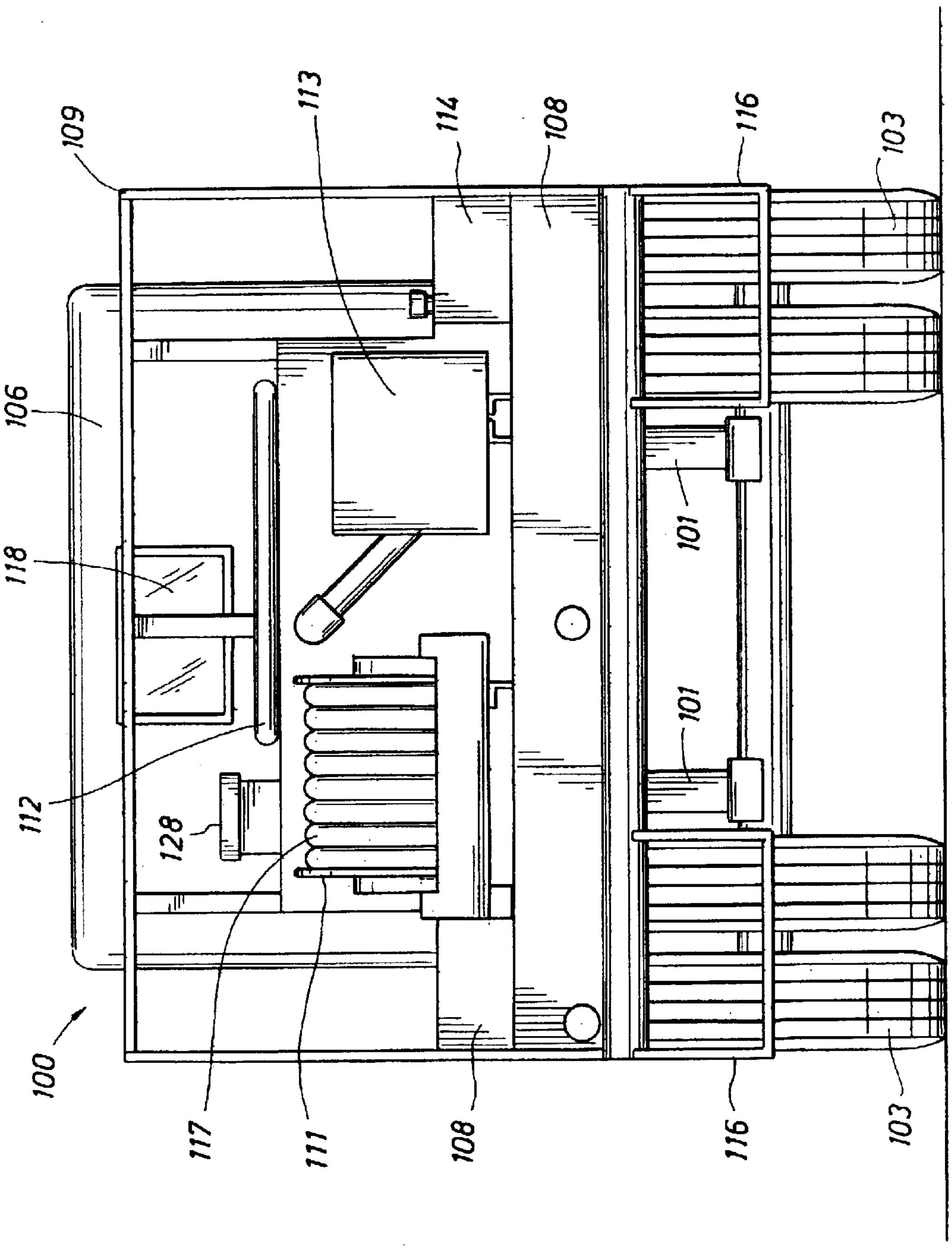
FIG. 2 is a rear plan view of the vehicle of FIG. 1.
Figure 3:
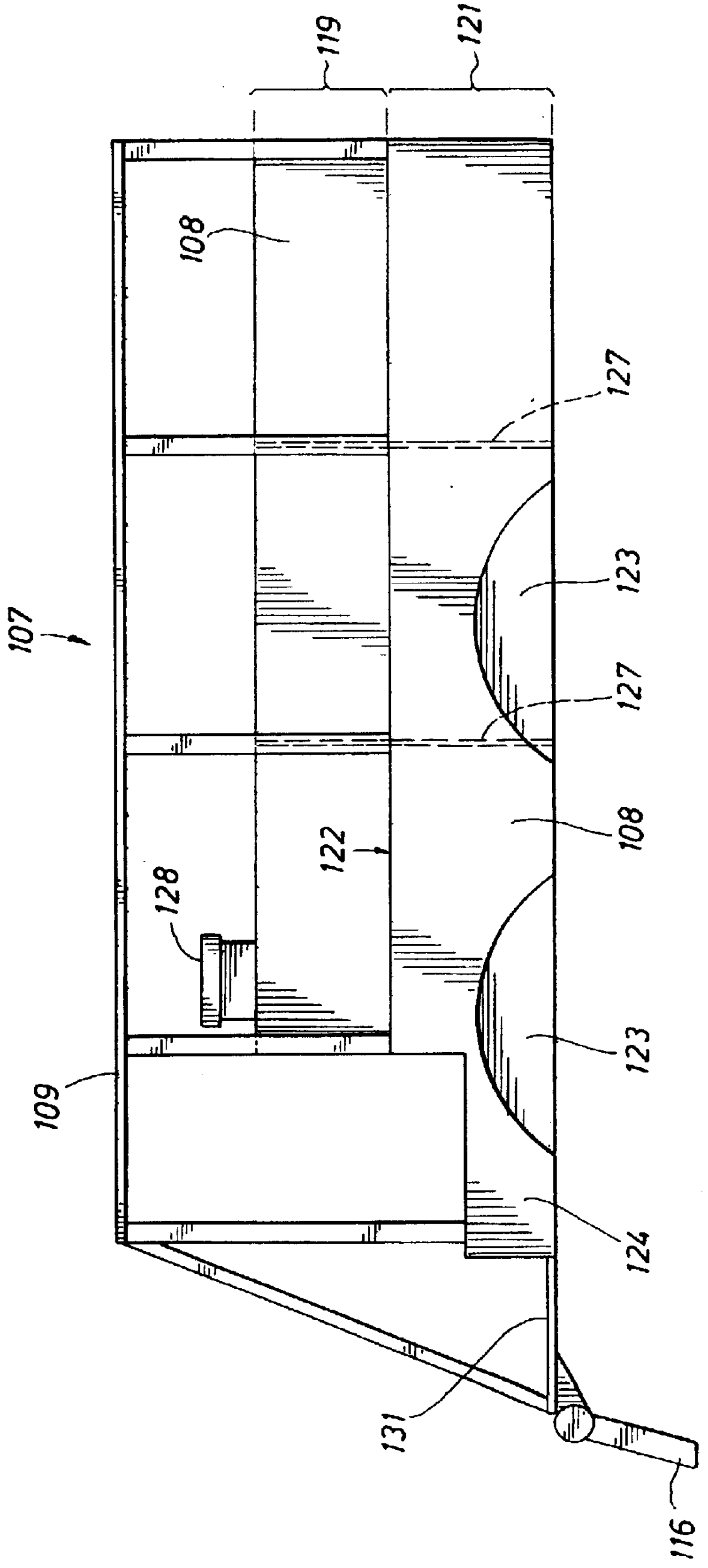
FIG. 3 is a side plan view of the tank assembly used in the vehicle of FIG. 1.
Figure 4:
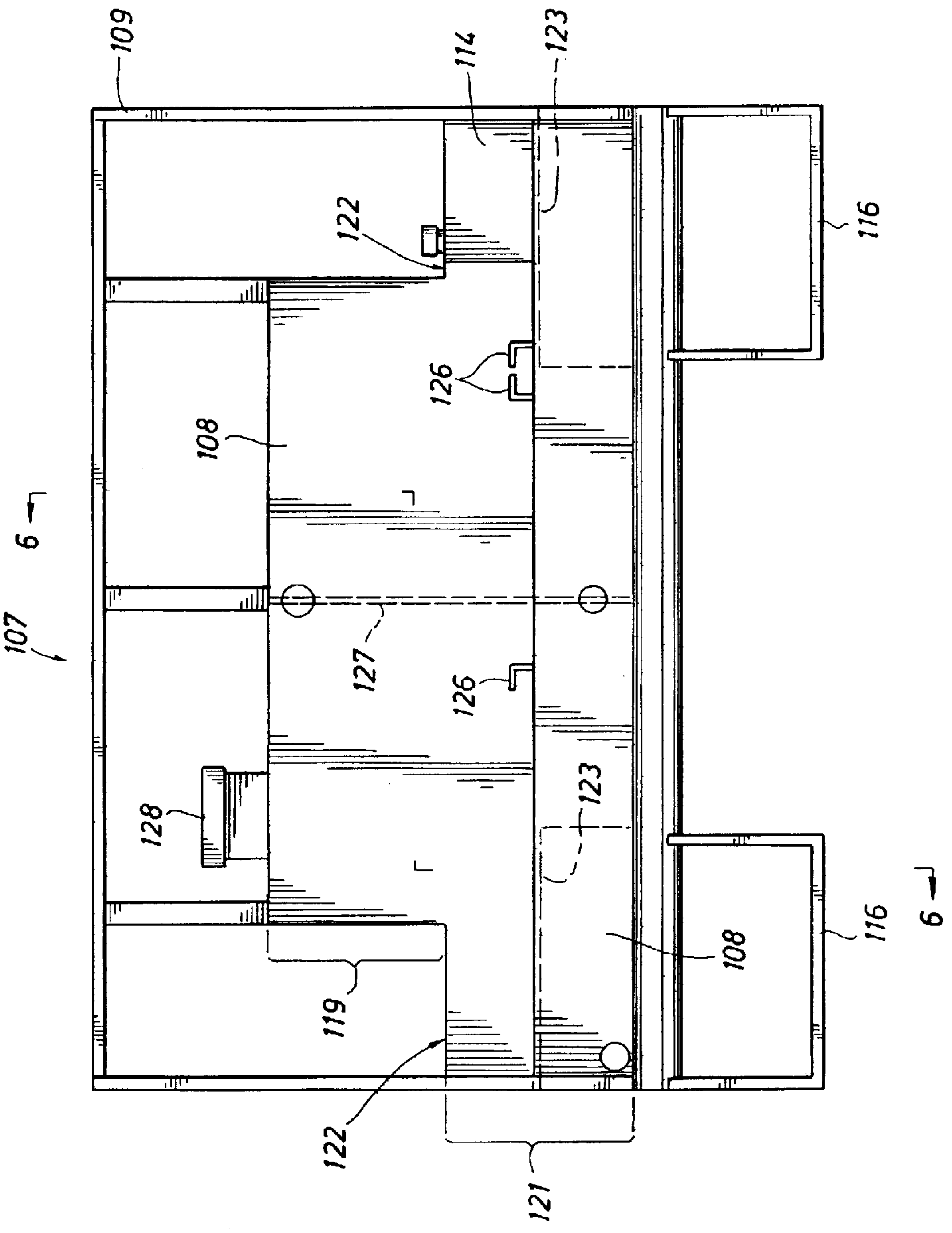
FIG. 4 is a rear plan view of the tank assembly of FIG. 3.
Figure 5:
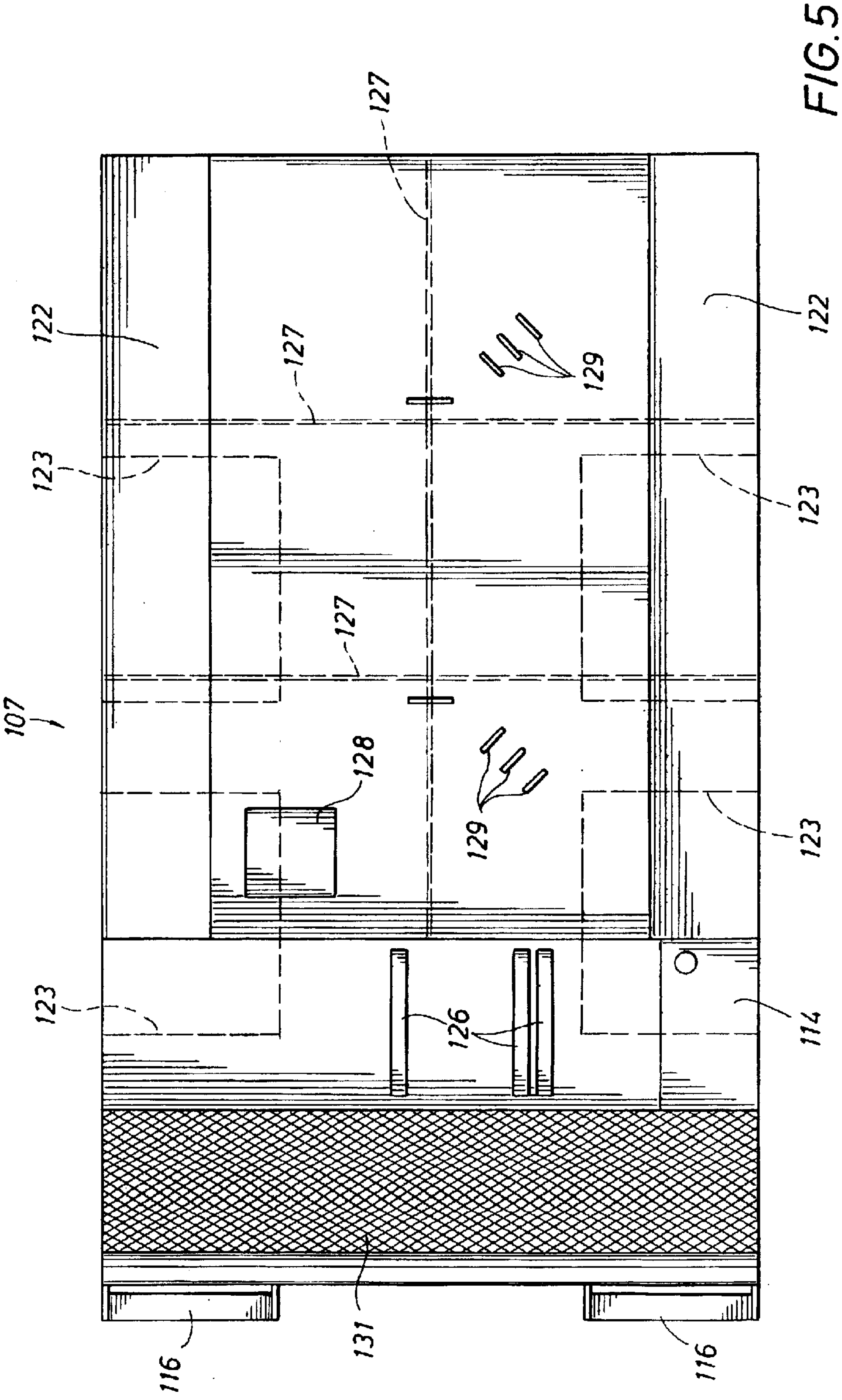
FIG. 5 is a top plan view of the assembly tank of FIG. 3.

Referring also to the rear plan view of FIG. 2, fire truck 100 also includes a water pump 113. In the illustrated embodiment, water pump 113 is a gasoline-powered water pump, and included on truck 100 is water pump fuel tank 114. However, other means of powering water pump 113 would also be acceptable, including, for example electrical power, or power from a power-take-off from the drivetrain of fire truck 100. Steps 116 are provided to facilitate access to the top of tank 108, upon which are mounted hose reel 111 and water pump 113.

Water pump 113 has two modes of operation. The first is to supply pressurized water from tank 108 to hose 117 as well as to other hoses or water spraying devices as desired for fighting fires. Water may also be supplied to other water distributing devices, such as for example, a water cannon or vehicle-mounted water spray nozzles. In a second mode of operation, water pump 113 is used to draw water through a filler hose from a water source, such as a stream, river, lake or pond, for the purpose of filling tank 108 with water in the field.

Although unaltered water is the preferred quenching agent for most fire fighting applications, other quenching agents would also be acceptable, including, for example, water mixed with a foaming agent or water mixed with a chemical fire retarding agent. These fire retarding agents may be mixed with the water in tank 108, or may be injected into the fluid stream as it is pumped from tank 108 by water pump 113.

In order to easily accommodate rough terrain, the ground clearance C of fire truck 100 (defined herein as the minimum distance between the rear differential, motor oil pan, or under-chassis skid plates, and the ground) in an exemplary embodiment of the present invention is preferably at least approximately 25 centimeters (10 inches), and even more preferably at least approximately 30 centimeters (12 inches). In accordance with the present invention, tank 108 of tank assembly 107 (the details of which are presented below with references to FIGS. 3–6) should have a center of mass CG as low as possible, and preferably less than approximately 46 centimeters (18 inches) above chassis 101. In one exemplary embodiment, the CG of tank 108 is located approximately 34 centimeters (13.5 inches) above the top of the chassis 101. At the same time, in this exemplary embodiment, tank 108 has a capacity of approximately 5000 liters (1,300 gallons). It should be noted that tank 108 may be mounted directly to chassis 101. However, in order to minimize the deleterious effects of direct metal-to metal contact it may be desirable to include a spacer between chassis 101 and tank 108. This spacer may be made of any acceptable material such as wood, an elastomeric material, or any suitable mechanically buffering material.

In contrast, in one example of a prior art tank of rectangular configuration mounted directly to a flatbed mounted on chassis 101, a center of mass of the tank is approximately 76 centimeters (30 inches) from the top of chassis 101 and the tank has a carrying capacity of 3,800 liters (1,000 gallons). In another example of a prior art tank of rectangular configuration mounted directly to a flatbed mounted on chassis 101, a center of mass of the tank is approximately 56 centimeters (22 inches) from the top of chassis 101 and the tank has a carrying capacity of 2,850 liters (750 gallons). In yet another prior art example, a tank of cylindrical configuration is mounted directly to a flatbed mounted on chassis 101, a center of mass of the tank is approximately 61 centimeters (24 inches) from the top of chassis 101 and the tank has a carrying capacity of 2,850 liters (750 gallons). In addition, the top of each of these prior tanks in these prior art trucks obstructs the reward view from the passenger compartment.

Thus, it may be seen that tank 108 of assembly 107 of fire truck 100, in accordance with the presently claimed invention, exhibits a much lower center of mass resulting in improved road stability and resistance to rollovers on rough sloping terrain, while at the same time greatly increasing water tank capacity. In addition, as may be seen with reference to FIGS. 1 and 2, tank 108 does not obstruct the rearward view from passenger compartment 106 through window 118 thus improving the safety of fire truck 100 when backing.

Turning now to FIGS. 3–6, the details of water tank assembly 107 are presented. Water tank assembly 107 includes water tank 108 to which is attached safety railing 109 and steps 116. Water tank 108 is formed to decrease the center of mass of the tank, while at the same time increasing overall capacity, and in the illustrated embodiment, is formed of upper tank portion 119 and lower tank portion 121. Upper tank portion 119 has a narrower width than lower tank portion 121, thus forming walkways 122 on top of lower tank portion 121. Walkways 122 permit fire fighting personnel to walk around and along the sides of the upper tank portion 119 of water tank 108 providing firefighting stations permitting on all sides of truck 100 access to fires on all sides of truck 100, while the personal remain on fire truck 100 and are retained by safety railing 109. In addition, formed integral with lower tank portion 121 are wheel wells 123 which conform to rear drive wheel sets 103 when tank assembly 107 is mounted on chassis 101 of fire truck 100. Wheel wells 123 permit the bottom of tank 108 to be mounted as closely as possible to the top of chassis 101 without interfering with the rotation or vertical movement of rear drive wheel sets 103.

In the illustrated and therefore nonlimiting example, fire truck 100 is fabricated from a pre-existing military surplus vehicle. During such fabrication, the flat bed originally included on the vehicle and mounted on chassis 101 is removed, and is replaced by tank assembly 107, thus permitting tank 108 to be mounted as closely as possible to the top of chassis 101.

The configuration of water tank 108 with upper tank portion 119 and lower tank portion 121, and the inclusion of wheel wells 123 within lower tank portion 121 permit water tank 108 to be located physically lower than prior approaches, thus lowering the center of mass greatly improving truck stability. At the same time, the carrying capacity of tank 108 is increased remarkably. Further, the mounting of tank assembly 107 directly to chassis 101 of fire truck 100, with or without spacers, further lowers the center of mass and further promotes truck stability.

In the illustrated embodiment, lower tank portion 121 is formed with step portion 124 which serves several purposes. First, it provides additional tank capacity at a location very close to chassis 101 thus further promoting the lowering of center of mass CG of tank 108. Second, it provides a step transition between step 116 and walkway 122. And third, it provides a mounting surface for hose reel 111, water pump 113, and water pump fuel tank 114. (See also FIGS. 1 and 2.) Angle brackets 126 are welded to step portion 124 and are provided for mounting hose reel 111 and water pump 113.

To further promote stability of truck 100, tank 108 is provided with internal baffles 127. These are shown in more detail with reference to FIG. 6. Also provided on tank 108 is tank access hatch 128 which may be used for filling tank 108 without use of pump 113, and hose retainers 129. In addition, the back of tank assembly 107 is provided with a non-slip surface 131, which may be formed of an expanded metal.

Figure 6:
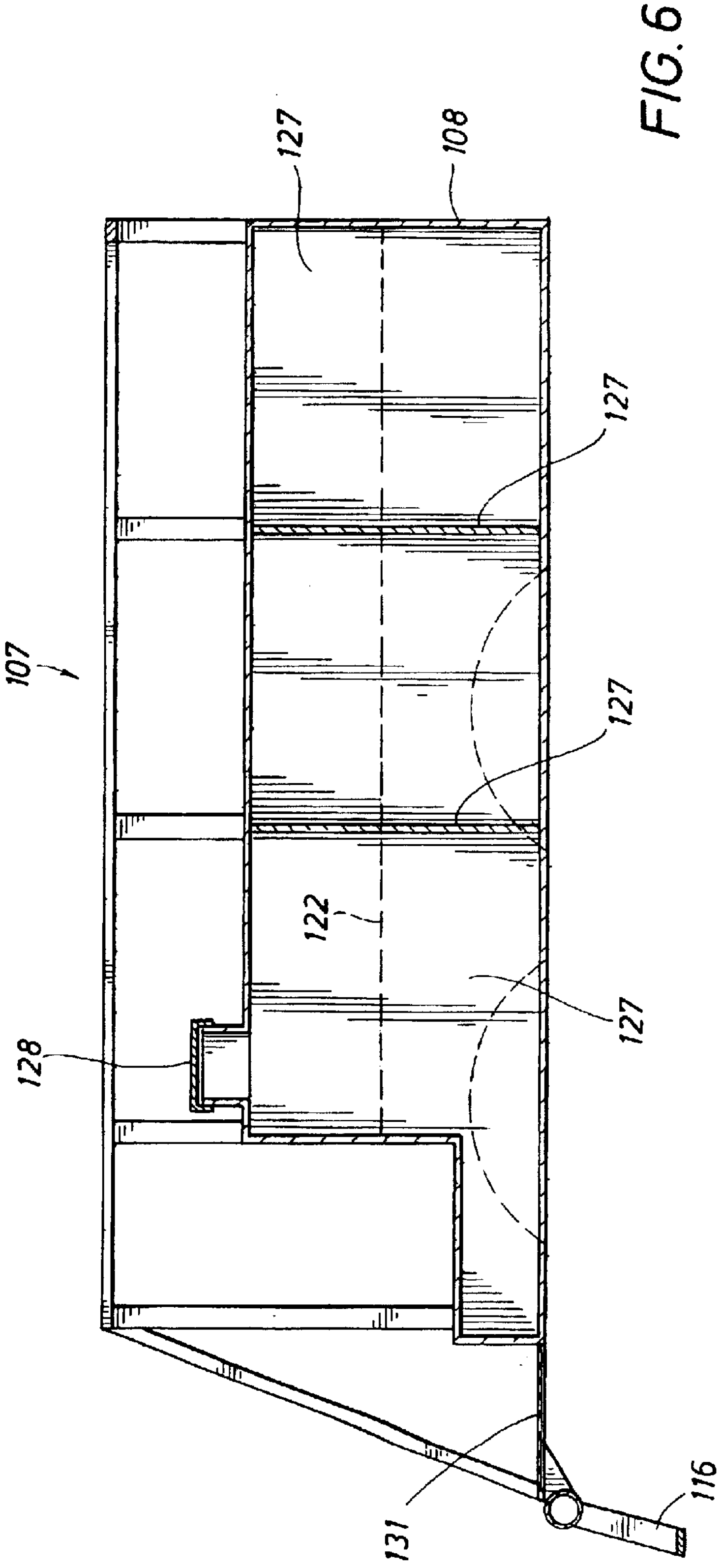
FIG. 6 is a partial cross-section of the assembly tank of FIG. 3, in accordance with an embodiment of the present invention.

Referring now to FIG. 6, the baffle structure within tank 108 is presented. FIG. 6 is a partial cross section view take through section 6—6 of FIG. 4. Tank 108 of tank assembly 107 includes a baffling structure in order to minimize liquid movement while fire truck 100 is accelerating, decelerating or turning. The baffling structure includes baffles 127 which are spaced apart to minimize fluid sloshing within tank 108. In the exemplary embodiment, baffles 127 are space longitudinally and also laterally within tank 108. Baffles 127 have holes therein to permit water flow during pumping and filling operations, while at the same time providing the described baffling function during acceleration and deceleration.

Tank 108 is preferably constructed of welded metal plates, and is coated with a corrosion resistant coating, such as epoxy paint or the like. The interior of tank 108 also preferably has a corrosion resistant coating such as paint, or galvanization. In addition, walkable surfaces including walkways 122 and filler hose storage section 112, are preferably non-skid surfaces for safety.

With the benefit of the present disclosure, those having skill in the art will comprehend that apparatus claimed herein and described above may be modified and applied to a number of additional, different applications, achieving the same or a similar result. The claims attached hereto cover all such modifications that-fall within the scope and spirit of this disclosure. For example, although the description of this disclosure focuses upon embodiments well suited for use as modifications to preexisting military surplus trucks, those of ordinary skill in the art having the benefit of this disclosure will recognize that the inventions described herein may be implemented in new vehicles, including vehicles other than trucks, or as modifications to other types of preexisting vehicles.

What is claimed is:

1. A fire truck, comprising:

a high ground-clearance motorized vehicle having a chassis, a passenger compartment mounted to the chassis and located at a forward portion of the vehicle, an engine mounted to the chassis and located at the forward portion of the vehicle, and drive wheels mounted to the chassis;

a quenching agent tank mounted to the chassis behind the passenger compartment, the quenching agent tank comprising:

a first tank portion; and a second tank portion located between the first tank portion and the chassis, a width of the second tank portion being greater than a width of the first tank portion and a length of the second tank portion being greater than a length of the first tank portion thereby forming a walkway on a top surface of the second tank portion and adjacent the first tank portion, a distance between the chassis and a center of mass of the quenching agent tank being less than approximately 46 centimeters, and a view from the passenger compartment being substantially 360° around the passenger compartment, the view being substantially unobstructed by the quenching agent tank;

a quenching agent pump and fire hose reel mounted to the top surface of the second tank portion, behind the first tank portion; and a fire hose retaining structure mounted to a top surface of the first tank portion.

2. The fire truck of claim 1, the second tank portion having integrally formed wheel wells adapted to surround the drive wheels.

3. The fire truck of claim 1, the vehicle having a ground clearance of at least approximately 25 centimeters.

4. The fire truck of claim 3, the vehicle having a ground clearance of at least approximately 30 centimeters.

5. The fire truck of claim 1, the distance between the chassis and the center of mass of the tank being less than approximately 35 centimeters.

6. The fire truck of claim 5, the distance between the chassis and the center of mass of the tank being less than approximately 30 centimeters.

7. The fire truck of claim 1, further comprising, a railing affixed to the second tank portion to substantially enclose the walkway.

8. The fire truck of claim 1, the quenching agent tank including internal baffle structures.

* * * * *